United States Patent [19]

Day

[11] Patent Number: 4,521,791

[45] Date of Patent: Jun. 4, 1985

[54] ION PROJECTION PRINTER WITH PSEUDO-CONTINUOUS BACK ELECTRODE

[75] Inventor: Gene F. Day, Cupertino, Calif.

[73] Assignee: Xerox Corporation, Stamford, Conn.

[21] Appl. No.: 505,645

[22] Filed: Jun. 20, 1983

[51] Int. Cl.[3] .............................................. G01D 15/06

[52] U.S. Cl. .............................................. 346/159

[58] Field of Search .................. 346/153.1, 155, 159; 355/3 FU

[56] References Cited

U.S. PATENT DOCUMENTS

| | | | |
|---|---|---|---|
| 3,161,882 | 12/1964 | Mullin | 346/153.1 |
| 3,714,665 | 1/1973 | Mutschler et al. | 346/153.1 |
| 3,717,880 | 2/1973 | Howell | 346/153.1 |

FOREIGN PATENT DOCUMENTS 55-55353 4/1980 Japan .

*Primary Examiner*—Thomas H. Tarcza

*Attorney, Agent, or Firm*—Serge Abend

[57] ABSTRACT

An improved ion projection printing apparatus including sequentially an imagewise charging station, a developing station and a fusing station for forming images upon a charge receptor sheet. The sheet is moved adjacent a pseudo-continuous, electrically conductive, back electrode which extends, in the process direction, from the charging station through the fusing station for eliminating toner image disruption of the unfused toner particles in the receptor sheet. The back electrode is provided with one or more thermal barrier air gaps which are small enough so that the back electrode acts, in the electrical sense, as if it were continuous.

3 Claims, 8 Drawing Figures

ION PROJECTION PRINTER WITH PSEUDO-CONTINUOUS BACK ELECTRODE

Figure 1:
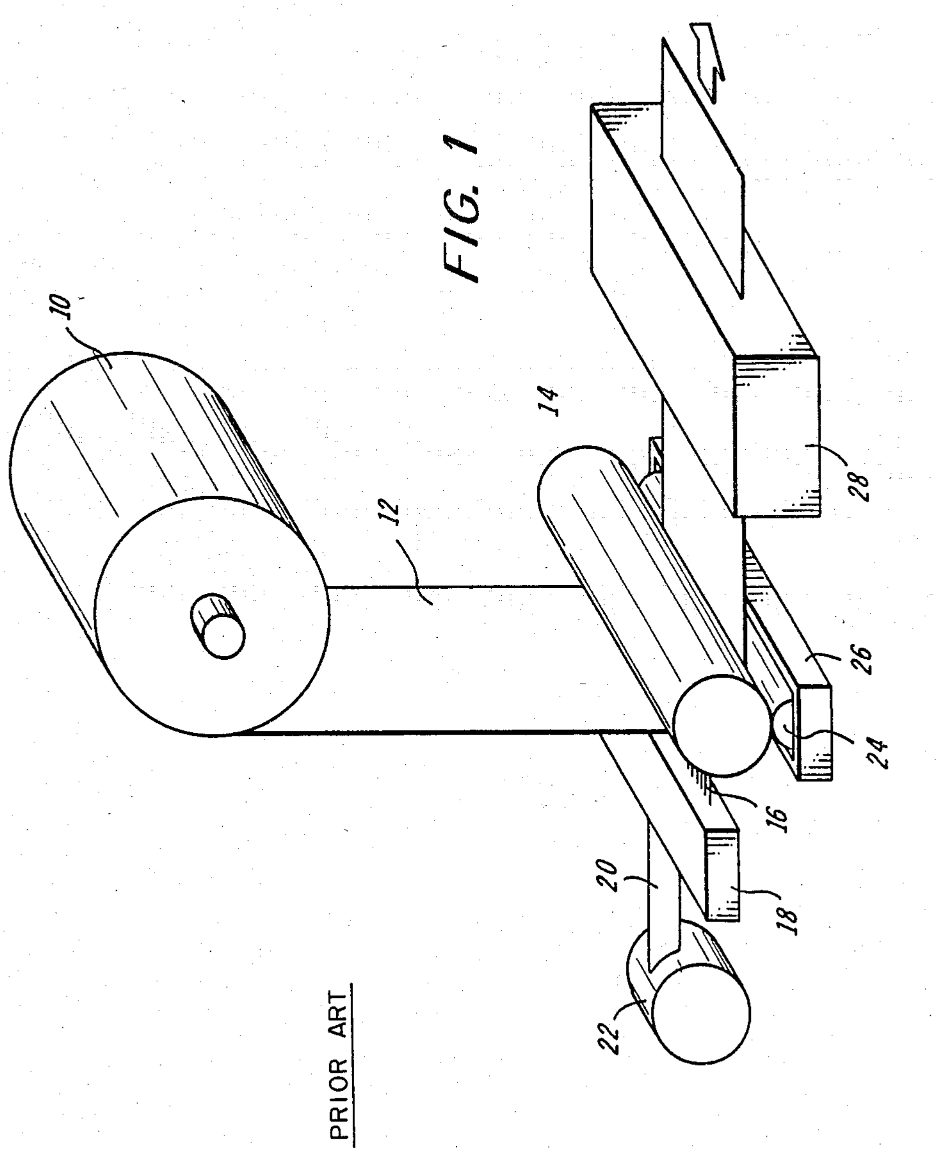
FIG. 1 PRIOR ART

This invention relates to an improved ion projection printing apparatus including an imagewise charging station, a developing station and a fusing station and a pseudo-continuous, electrically conductive, back electrode extending from the charging station through the fusing station. By the term pseudo-continuous applicant means that the electrode structure includes one or more minute thermal barrier gaps therein, transverse to the processing direction, but that it acts, in the electrical sense, as if it were continuous.

In U.S. Pat. No. 4,463,363, assigned to the same assignee as the present application entitled "Fluid Jet Assisted Ion Projection System" (Gundlach et al) there is described a high resolution, low cost, ion projection printing system. The application relates to a unique device for the generation of ions and their subsequent selective deposition, in an image configuration, onto a charge receptor. A jet of transport fluid traverses a channel passing through the ion generating device, sweeping the ions past a modulating device for delivering ion "beams" onto a charge receptor sheet, which may be ordinary paper. The paper sheet is held adjacent an electrically biased back electrode, which establishes a strong electric field for accelerating the ions toward the sheet and for providing a counter-charge for the ions supported on the exposed surface of the sheet. Downstream of the ion projection station, at a developing station, the image charge pattern may be rendered visible by toner particles which would be subsequently fixed to the receptor sheet at a fusing station. Neither the developing or fusing stations are features of the copending application.

In U.S. Pat. No. 3,714,665 (Mutschler et al) entitled "Electrostatic Recording With Improved Electrostatic Charge Retention" there is taught a printing apparatus for recording upon ordinary paper. A charging station, shown schematically by an arrow, which may take the form of any suitable means, is provided for depositing an electrostatic charge pattern upon the paper. A conductive back electrode is positioned in contact with the opposite side of the paper and extends from the charging zone through a development zone, at which location the charge pattern is made visible.

In Japanese Pat. No. 55-55353 (Uchimura) entitled "Electrostatic Printing Device", images are formed on ordinary paper. The described apparatus includes a corona wire ion generator and a modulation structure comprised of two, spaced, conductive, apertured plates. By adjusting the potential difference between the apertured plates, ions are allowed to pass through the apertures or are inhibited from passing. Those ions passing through the modulation structure are then attracted to and accelerated by a back electrode and deposit upon the paper, interposed between the ion source and the back electrode. A development station and fusing station are also incorporated in the printing device. It is the intent of the patented invention to prevent damaging the electrostatic image pattern by eliminating the discharge between the paper and the back electrode prior to development of the image. To this end, the same solution taught in Mutschler et al (described above) is set forth, namely, extending the back electrode through the development station.

It has been found that the backing electrode structures taught by Uchimura and by Mutschler et al, if utilized with an ion projection image input device of the type taught by Gundlach et al are each inadequate to achieve good image quality. As the paper with the toned image thereon separates from the back electrode, before the image is fused, toner image disruption is likely to occur. The disruption has been observed to take place when the distance between the paper and the back electrode increases to the extent that the Paschen breakdown voltage is exceeded, resulting in change transfer between the back electrode and the back surface of the paper.

In a copending patent application Ser. No. 505,641, filed June 20, 1983 assigned to the same assignee as this application, filed concurrently herewith and entitled "Ion Projection Printer With Extended Back Electrode" (Wilcox et al) there is taught the use of a continuous back electrode for eliminating toner image disruption of the unfused toner particles on the receptor sheet.

It is also the primary object of the present invention to provide an ion printing apparatus in which toner image disruption, of the unfused toner particles, is eliminated. Additionally, it is another object of this invention is to provide an ion printing apparatus in which the thermal path between the fuser zone and the image formation and development zone is broken without adversely effecting the electrical continuity between these zones.

This invention may be carried out, in one form, by providing an ion printing system capable of placing electrostatic charges, in image configuration, upon a relatively moving charge receptor, such as a length of ordinary paper. The system includes an ion projection device, a development device, and a fusing device. An electrically conductive back electrode, positioned adjacent the image receptor, on the side opposite the ion projection device, serves to accelerate charge deposition upon the receptor and to provide a counter-charge to the latent image ion charge, extends pseudo-continuously (i.e. although there is at least one thermal barrier gap therein, in an electrical sense, it acts as if it were continuous) from the ion projection region, through the fusing region. Once fused upon the paper, the image is incapable of being disrupted as the sheet is stripped from the back electrode by air breakdown charge transfer between the sheet and the back electrode.

Figure 2:
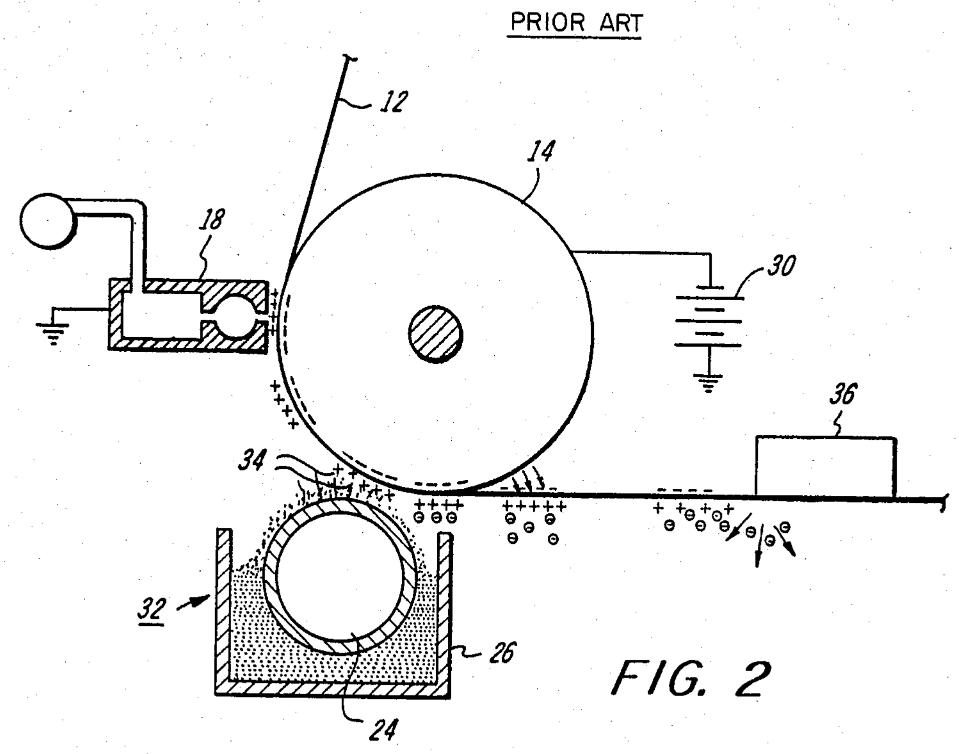
Figure 3:
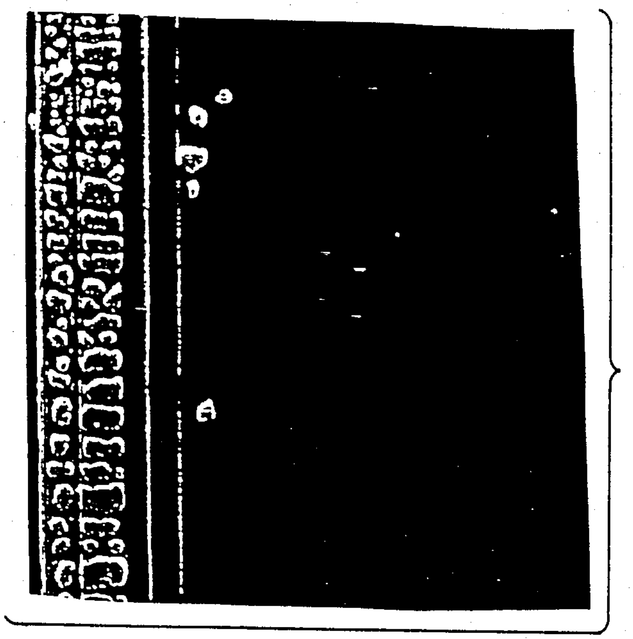
Figure 4:
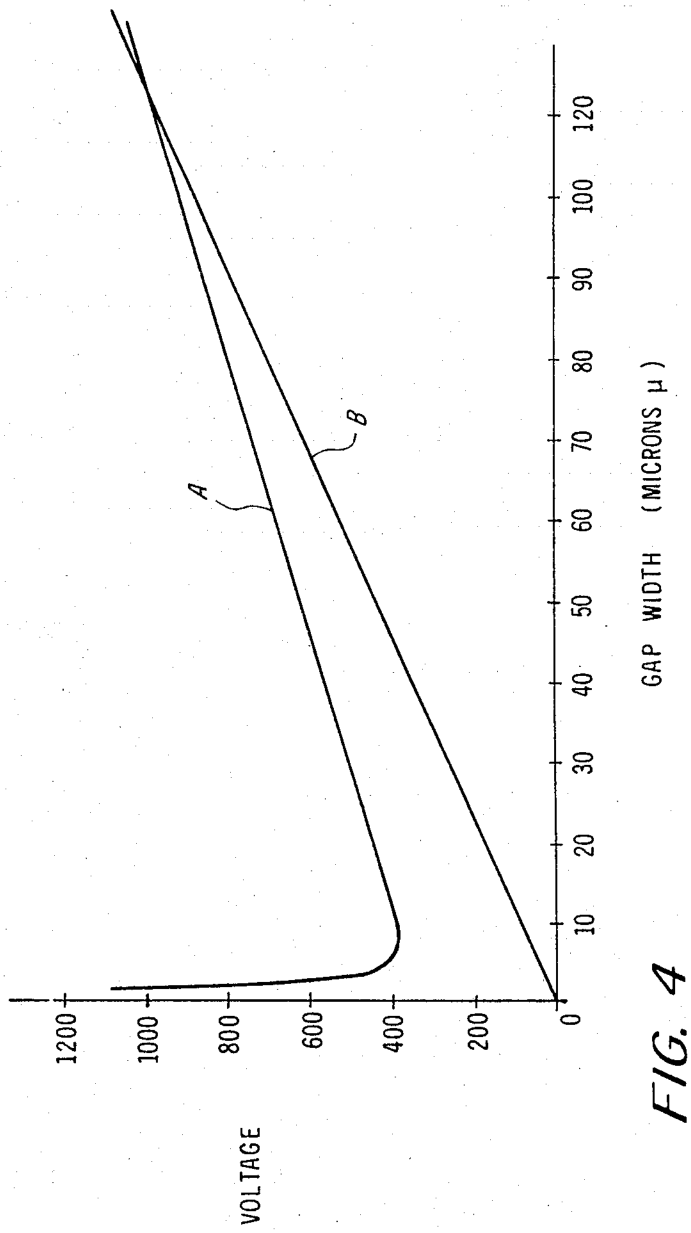
Figure 5:
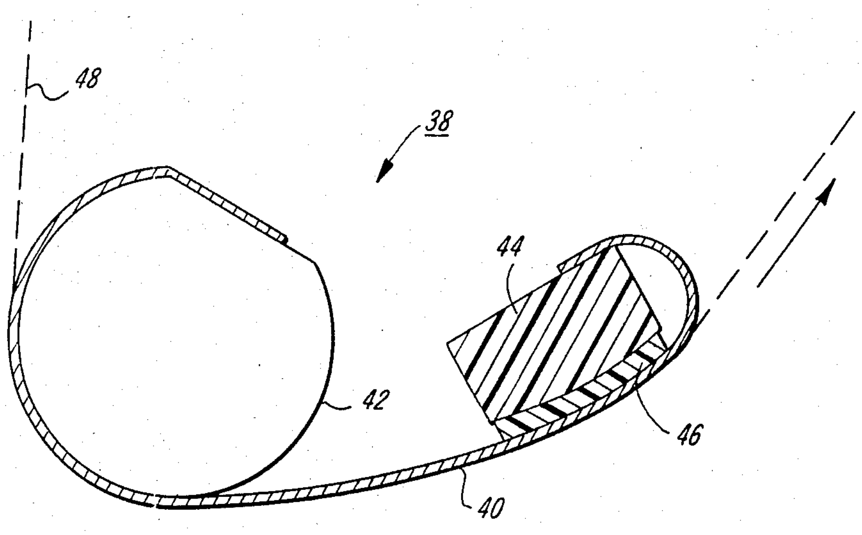
Figure 6:
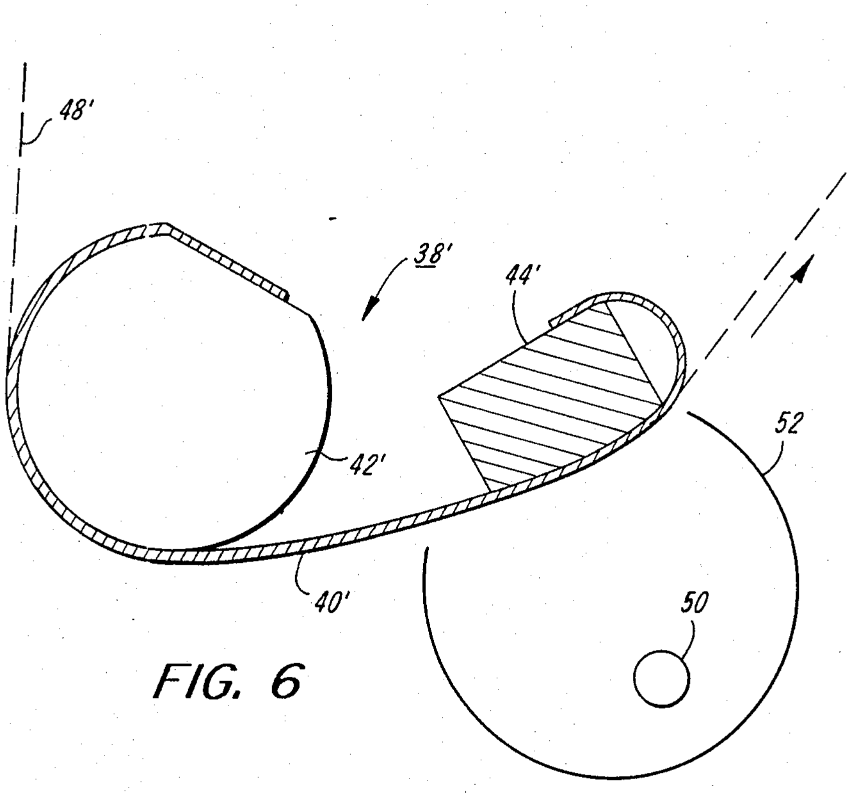
Figure 7:
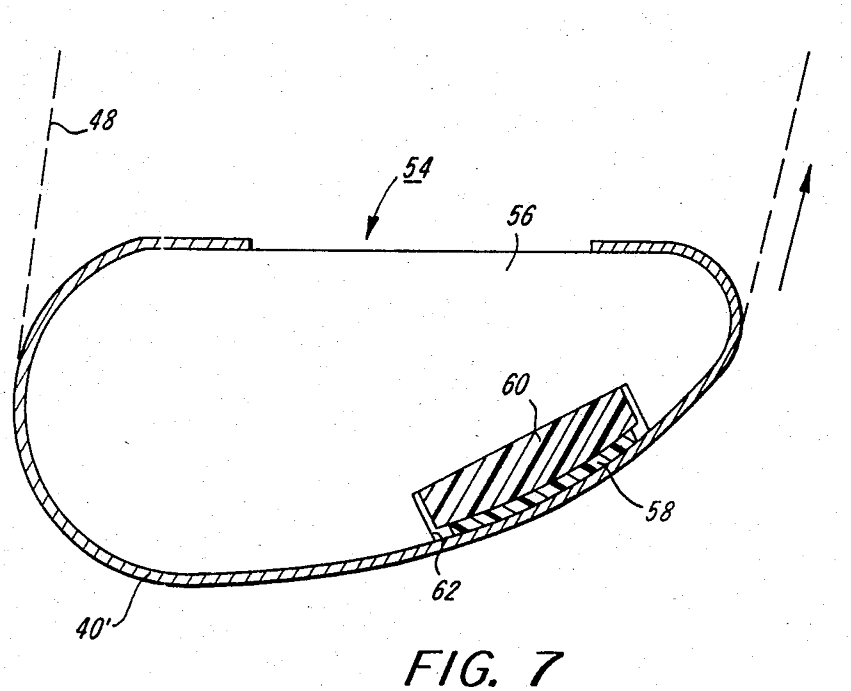
Figure 8:
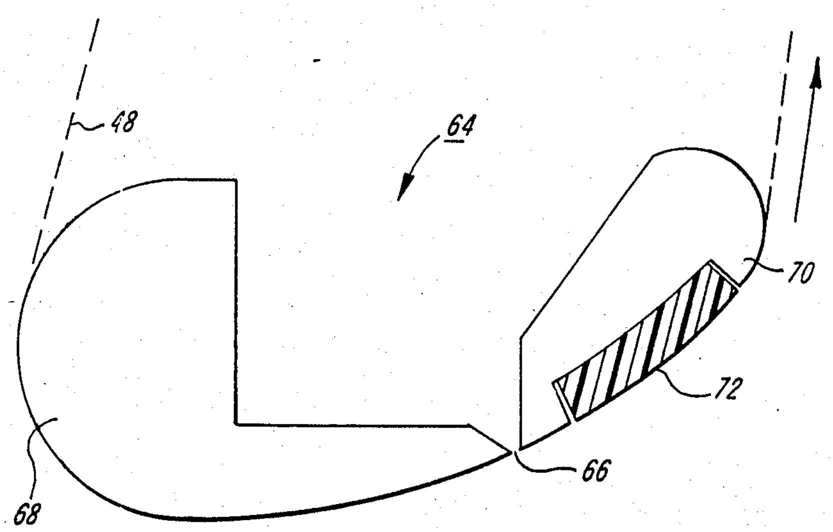

Other objects and further features and advantages of this invention will be apparent from the following description considered together with the accompanying drawings wherein:

FIG. 1 is a perspective view of an ion projection printing apparatus configured in accordance with the prior art teachings, FIG. 2 is a partial side elevation view of the FIG. 1 apparatus showing the areas of image disruption, FIG. 3 is a sample of the distorted image of a solidly toned area, FIG. 4 is a graph showing the Paschen curve for air breakdown together with electric field plots for charge values normally applied to the image receptor paper, FIG. 5 is a side elevation view showing one form of the continuous extended back electrode incorporating a platen fuser, FIG. 6 is a side elevation view similar to FIG. 5, in use with a flash fuser, FIG. 7 is a side elevation view showing another form of the continuous extended back electrode, and FIG. 8 is a side elevation view showing yet a form of the pseudo-continuous extended back electrode.

With particular reference to the drawings there is illustrated in FIG. 1 an ion projection printing system which does not incorporate the improvement of the present invention. A supply roll 10 of a suitable image receptor 12, preferably ordinary paper, delivers the receptor to an image receiving zone in intimate contact with the surface of a back electrode 14. The image is formed by the selective projection of ions 16 from the generation and projection head 18, the ions being transported through the head by a transport fluid, such as air, delivered by duct 20 from a suitable pump 22.

An example of one form of the ion generation and projection head 18 is set forth in U.S. Pat. No. 4,463,363 (Gundlach et al) more fully identified above. Another type of ion generation and projection head is disclosed in a copending U.S. patent application Ser. No. 471,380, filed Mar. 2, 1983, also assigned to the same assignee as the present application, entitled "Fluid Jet Assisted Ion Projection and Printing Apparatus" (Sheridon).

The latent image is made visible by the application of toner particles to the charge bearing areas of the paper. A typical development apparatus comprises magnetic brush roller 24 rotatable through a sump 26 of magnetic toner particles where it picks up the toner and brushes it over the paper surface. Once the sheet has been developed it is transported past fuser 28 where the toner is caused to melt and to flow into the paper fibres forming an indelible print of the image.

In FIG. 2, there is illustrated in more detail, the problem areas encountered in the printing system of FIG. 1. Positive ions exit the ion generation and projection head 18 and deposit, in image configuration, on one side of the paper 12. The ions are accelerated to the paper by a field, established between the back electrode 14, connected to a high voltage bias source 30 (on the order of 1300 to 1400 volts DC), and the normally electrically grounded head 18. An image potential is created across the paper thickness by the induction of negative counter-charges, in the conductive back electrode behind the paper, to the positive image charges. Then the paper passes the development station 32 where the image is made visible by a single component magnetic dry toner. Development station 32 comprises a sump or trough 26, within which toner is stored for application by means of a magnetic brush roller 24. At the development zone, adjacent the paper 12, tendrils 34 of linked magnetic toner particles are formed, extending between the roller 24 and the sheet. As these tendrils of toner particles sweep over the surface of the paper a negative charge is induced on the particles and some are attracted to the positive surface charges of the established dipoles and adhere to the paper. Next, the paper is stripped from the back electrode and is drawn past the platen fuser 36 where the toner is heated to its melting point and flows into the paper fibres.

In order to achieve good image quality, it is necessary to maintain intimate contact between the back electrode 14 and the paper 12. However, as the sheet passes from the development station 32 to the fuser 36 it is normally stripped away from the back electrode 14. As the distance of separation increases, the electric field increases, causing the Paschen breakdown voltage to be reached and disruptive charge transfer to occur. During this phenomenon, the negative charges in the back electrode, jump or spark across the gap, to the rear surface of the paper. This is illustrated in FIG. 2 by the wavy arrows in the nip. In areas where there is a high charge density charge, i.e. large solidly toned areas, as opposed to line images, toner explosions have been observed, leaving very low density spots in the image, as shown in FIG. 3. Although the mechanism of toner exploding off of the paper is not fully understood, it is believed that the phenomenon is the result of mutual repulsion of some of the same polarity toner particles taking place subsequent to the uneven distribution of positive charges on the back surface of the paper, caused by the disruptive charge transfer.

If the paper has been separated from the back electrode before the image is fused, an additional area of toner disruption is exhibited as the paper arrives at the leading edge of the electrically conductive heated fuser. The toner particles again repel one another, and can be visually observed to explode in a semi-spherical manner, away from the paper surface (note FIG. 2). A definitive explanation for the disruption is not presently available, however, it is believed that it may be related to the uneven distribution of positive charges on the back surface of the paper, caused by the disruptive charge transfer as the paper is stripped from the back electrode.

When two electrostatic charge bearing surfaces are separated by a gas film, transfer of electrostatic images from one surface to the other requires movement of the electrical charges through the gas. The phenomenon of electrical breakdown of an air gap (disruptive charge transfer) is explained by Paschen's law and may be graphically represented for air by curve A of FIG. 4. Looking at curve A from right to left, it can be seen that as the gap between charge bearing surfaces gets smaller the breakdown voltage decreases and arrives at a minimum of about 360 volts at about 7.5 microns. Thereafter, as the gap gets smaller yet, the breakdown voltage increases because, it is believed, avalanching or sparking becomes less probable in the 2 to 4 micron range.

Typically, the ion generation and projection head 18 of the type illustrated in FIG. 2 is capable of depositing ions having a charge density in the range of about 7 to 8 nanocoulombs/cm$^2$. A charge density of that magnitude would yield an electric field of about 8 to 9 volts/micron (plotted as curve B in FIG. 4). Thus, as the paper 12 is separated from the back electrode 14 the electric field will increase linearly at the rate of 8 or 9 volts/micron. At a separation of about 125 microns (i.e. about 5 mils) the electric field plot (curve B) crosses the Paschen threshold plot (curve A) and disruptive breakdown will occur.

It has been discovered that by extending the back electrode through the fusing station, the unfused toner image, overlying the charge image, supported on the paper, will maintain its integrity. Separation of the paper from the back electrode will occur only after the image is fused and can resist disruption. A number proposed electrode configurations is illustrated in FIGS. 5 through 8.

In FIG. 5, the back electrode 38 comprises a thin electrically conductive foil sheet 40 extending between and supported by conductive cylindrical support 42 and thermally insulating fuser support block 44 carrying on its surface a heater 46, such as an electrical reistance-type heating blanket. As in the FIG. 2 construction, the printing steps of ion writing and developing take place on the image receptor sheet 48 at a location adjacent the cylindrical support 42, as the paper slides over the smooth surface of the foil sheet 40. The foil sheet, which has been successfully implemented as a 6 mil thickness of stainless steel, performs two major functions. First, it continuously extends the back electrode through the fusing zone for eliminating the toner disruption problem occurring as the sheet is stripped from the back electrode. Secondly, its thin gauge inhibits thermal transfer from the hot fuser region to the cool image formation and development regions. The second function is extremely important in this type of printing process since excessive heating of the cylindrical support 42 will heat the paper 48, making it conductive and thus preventing it from holding a charge on its surface. Excessive heating of the cylindrical support 42 could also cause the toner brush to melt and agglomerate the toner in the sump. The first function is performed completely satisfactorily by this configuration but there may be some thermal transfer back to cylindrical support after prolonged heating of the fuser blanket.

The back electrode configuration 38' in FIG. 6 is virtually identical to that of FIG. 5, therefore similar parts will be identified by the same numerals with a prime (') added. Modifications have been made in the fuser area in order to eliminate one of the shortcomings of the FIG. 5 embodiment. Cylindrical support 42' and fuser support block 44' support the foil sheet 40'. The fusing function is accomplished by a flash fusing system comprising a flash lamp 50 surrounded by a suitable reflector 52. In the process of flash fusing the light pulse is of very short duration, approximately 50 to 200 ms, so that only the dark toner absorbs emitted light, becomes hot and melts, with little heat transfer to paper. The white paper reflects the light and is not heated directly by the fuser. In so doing, no heat will be transferred back to the imaging and development stations. In fact, it is possible to construct the entire back electrode structure, extending from the image formation region through the fusing region, from one solid electrically conductive member.

In the FIGS. 5 and 6 embodiments is is often difficult to maintain the foil sheet 40/40' completely flat as is necessary to obtain uniform images. Foil warping ("oil canning") caused by uneven thermal gradients, between its hot (fuser) end and its cool (imaging) end and between the hotter center and the cooler edges (in the direction transverse to the processing direction), if excessive, can render poor images because the paper does not completely conform to the back electrode surface. The undulating paper may contact the magnetic developer brush to different heights, and in some cases, the separation between the paper and the foil can exceed 4 to 5 mils, surpassing the Paschen breakdown gap and causing disruptive discharges to occur.

By supporting the foil sheet 40' over substantially its entire extent, as illustrated on the back electrode 54 of the configuration of FIG. 7, warping of the foil may be somewhat alleviated. It may be mounted upon a solid support block 56 in such a way as to maintain it in a stressed condition, opposing thermal creep, and thus remain relatively smooth even after it is heated. In order to prevent heating of the image formation and development areas, fuser blanket 58 may be thermally isolated from the block 56 by a support pad 60, made of Teflon or a similar thermal insulating material, seated in a recess 62 formed in the block. In addition, the duty cycle of the fuser blanket 58 may be reduced in a known manner by cycling the fuser controls.

The foregoing back electrode configurations (FIGS. 5 to 7) have all comprised continuous electrically conductive elements spanning the imaging to fusing process subsystems.The pseudo-continuous back electrode 64 illustrated in FIG. 8 performs all the beneficial functions of the foregoing configurations without any of their shortcomings. It has been determined that the back electrode need not be absolutely continuous, but may include one or more minute thermal barrier gaps. If these gaps are sufficiently short, in the process direction, the charge pattern upon the paper will never be separated far enough from its counter-charge to cause disruptive charge transfer to the back of the paper 48'. As the image crosses the small gap, a counter-charge will be induced in the downstream segment of the back electrode before disruptive discharge can occur. At the same time, owing to the extremely low thermal conductivity of air, the electrode segments will be thermally isolated. Since the thermal conductivity of air is $2.564\times10^{-4}$ watt/cm.°C. and the thermal conductivity of aluminum is 2.37 watt/cm.°C., air is 10,000 times more thermally insulating than aluminum.

Even a very narrow gap 66 can easily thermally isolate the cool imaging and development back electrode segment 68 from the hot platen fuser segment 70, within which fuser blanket 72 is supported. Utilizing this construction, it is not necessary to use a foil sheet with its inherent propensity for buckling. Rather, the structures 68 and 70, upstream and downstream of the gap 66, may be made of aluminum or a comparable isothermal material, which will eliminate non-uniform expansion problems. The gap itself may be in the range of about 25 to 1000 microns wide (about 1 to 40 mils), but is is presently believed that somewhat wider gaps may work. Clearly then, the small air gap will be able to prevent the uniformly hot fuser segment 70 from loosing heat to the uniformly cool back electrode segment 68.

It should be understood that the present disclosure has been made only by way of example and that numerous changes in details of construction and the combination and arrangement of parts may be resorted to without departing from the true spirit and scope of the invention as hereinafter claimed.

What is claimed is:

1. An ion projection printing apparatus for printing on one side of a charge receptor sheet and comprising, sequentially in a processing direction, ion projection charging means, development means and fusing means and characterized by including back electrode means positioned to be located on the opposite side of the sheet from the charging means and development means and to receive the sheet in intimate contact, said electrode means extending from the charging means through the fusing means and having with at least one discontinuity therein extending across said electrode means transversely to the processing direction, said discontinuity being located between the fusing means and the development means, whereby said back electrode acts, in the electrical sense, as if it were continuous but inhibits thermal flow therethrough between the hot fuser means and the cool charging and development means.

2. The ion projection printing apparatus as defined in claim 1 characterized in that said discontinuity comprises a thermally insulating air gap.

3. The ion projection printing apparatus as defined in claim 2 characterized in that said discontinuity is 25 to 1000 microns wide.

* * * * *